(12) United States Patent
Rogers

(10) Patent No.: US 8,407,048 B2
(45) Date of Patent: Mar. 26, 2013

(54) METHOD AND SYSTEM FOR TRANSCRIBING TELEPHONE CONVERSATION TO TEXT

(75) Inventor: Sean Scott Rogers, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1160 days.

(21) Appl. No.: 12/127,562

(22) Filed: May 27, 2008

(65) Prior Publication Data

US 2009/0299743 A1   Dec. 3, 2009

(51) Int. Cl.
  *G10L 15/26* (2006.01)
  *G10L 17/00* (2006.01)
  *H04M 1/65* (2006.01)
(52) U.S. Cl. ............ 704/235; 704/246; 704/270.1; 379/88.01; 379/88.02
(58) Field of Classification Search .......... 704/235, 704/246, 254, 270.1; 379/88.01, 88.02
  See application file for complete search history.

(56) References Cited

U.S. PATENT DOCUMENTS

| | | | | |
|---|---|---|---|---|
| 5,127,003 A * | 6/1992 | Doll et al. | | 370/259 |
| 5,732,216 A * | 3/1998 | Logan et al. | | 709/203 |
| 5,953,700 A * | 9/1999 | Kanevsky et al. | | 704/270.1 |
| 6,081,780 A * | 6/2000 | Lumelsky | | 704/260 |
| 6,222,909 B1 | 4/2001 | Qua et al. | | |
| 6,512,828 B1 * | 1/2003 | Styron | | 379/453 |
| 6,665,547 B1 | 12/2003 | Ehara | | |
| 6,980,953 B1 * | 12/2005 | Kanevsky et al. | | 704/235 |
| 7,113,572 B2 | 9/2006 | Holmes | | |
| 7,133,513 B1 * | 11/2006 | Zhang | | 379/202.01 |
| 7,478,044 B2 | 1/2009 | Kirkland et al. | | |
| 7,606,706 B1 * | 10/2009 | Rubin et al. | | 704/235 |
| 7,865,400 B2 * | 1/2011 | Rogers et al. | | 705/26.41 |
| 7,937,270 B2 * | 5/2011 | Smaragdis et al. | | 704/256 |
| 8,065,079 B2 * | 11/2011 | Rogers | | 701/516 |
| 2002/0161578 A1 * | 10/2002 | Saindon et al. | | 704/235 |
| 2003/0190020 A1 | 10/2003 | Kitchings | | |
| 2005/0137867 A1 * | 6/2005 | Miller | | 704/252 |
| 2005/0195798 A1 | 9/2005 | Kirkland et al. | | |
| 2006/0062371 A1 * | 3/2006 | Vanderheiden et al. | | 379/211.02 |
| 2007/0024721 A1 * | 2/2007 | Rogers | | 348/229.1 |
| 2007/0112571 A1 * | 5/2007 | Thirugnana | | 704/270 |
| 2008/0059177 A1 * | 3/2008 | Poirier et al. | | 704/251 |

(Continued)

FOREIGN PATENT DOCUMENTS

| | | | |
|---|---|---|---|
| JP | 2000196730 A | 7/2000 | |
| JP | 2002290536 A | 10/2002 | |

(Continued)

OTHER PUBLICATIONS

International Search Report and Written Opinion—PCT/US2009/043537, International Search Authority—European Patent Office—Aug. 7, 2009.

*Primary Examiner* — Martin Lerner
(74) *Attorney, Agent, or Firm* — James T. Hagler

(57) ABSTRACT

Methods and systems for transcribing portions of a telephone conversation to text enables users to request transcription such as by pressing a button on a mobile device, with the request transmitted to a server including transcription software. The server transcribes some or all of the telephone conversation to text, and transmits the text to the mobile device. The text data may be scanned for selected information, and only the selected information transmitted to the mobile device. The selected information may be automatically stored in memory of the mobile device, such as in an address book.

66 Claims, 8 Drawing Sheets

U.S. PATENT DOCUMENTS

| | | | |
|---|---|---|---|
| 2008/0095332 A1* | 4/2008 | Myers et al. | 379/88.14 |
| 2008/0198980 A1* | 8/2008 | Skakkebaek et al. | 379/88.13 |
| 2008/0300873 A1* | 12/2008 | Siminoff | 704/235 |
| 2009/0119100 A1* | 5/2009 | Akella et al. | 704/235 |
| 2009/0254343 A1* | 10/2009 | Hart | 704/246 |
| 2009/0313693 A1* | 12/2009 | Rogers | 726/21 |

FOREIGN PATENT DOCUMENTS

| | | |
|---|---|---|
| JP | 2004173124 A | 6/2004 |
| JP | 2005012377 A | 1/2005 |
| JP | 2006109289 A | 4/2006 |
| JP | 2006174111 A | 6/2006 |
| JP | 2007180828 A | 7/2007 |

* cited by examiner

METHOD AND SYSTEM FOR TRANSCRIBING TELEPHONE CONVERSATION TO TEXT

FIELD OF THE INVENTION

The present invention relates generally to telecommunications technologies, and more particularly to methods and systems for transcribing audio data to text data on telephone networks.

BACKGROUND

The memory and processing capacity of today's typical wireless mobile communication device (e.g. cell phone) provide users with the capability of storing relatively large quantities of data. Typically, the memory capacity of a mobile device is used for storage of contact information such as phone numbers, email addresses and mailing addresses. A typical mobile device user may have dozens or even hundreds of stored phone numbers and addresses.

Entry of contact information can be frustrating and slow, particularly in situations where the contact information is related to a user by spoken word during a telephone conversation. Entering and storing information received in this way can be problematic for the user because the information must first be transferred to some manual storage method (e.g., written on a piece of paper) and then manually entered into the mobile device. This is especially troublesome if the user is driving a car, or if the user does not have writing implements available.

SUMMARY

The various embodiments include methods and systems for providing a user's mobile device with text data representative of a portion of a conversation. Embodiments may scan and identify phone numbers and addresses in the text data so this information can be extracted from the text data and stored within the mobile device, such as in an address book or other memory location. Embodiments enable buffering some or all a conversation before transcribing the buffered conversation into text data.

Various embodiments enable a mobile device to request a server to transcribe conversation to text data, prompting the server to make the transcription and transmit the text data to the user's telephone for storage. The server may also scan, identify and extract phone numbers and addresses in the text data, and transmit the data to the user's mobile device.

BRIEF DESCRIPTION OF THE DRAWINGS

The accompanying drawings, which are incorporated herein and constitute part of this specification, illustrate exemplary embodiments of the invention. Together with the general description given above and the detailed description given below, the drawings serve to explain features of the invention.

DETAILED DESCRIPTION

Figure 1:
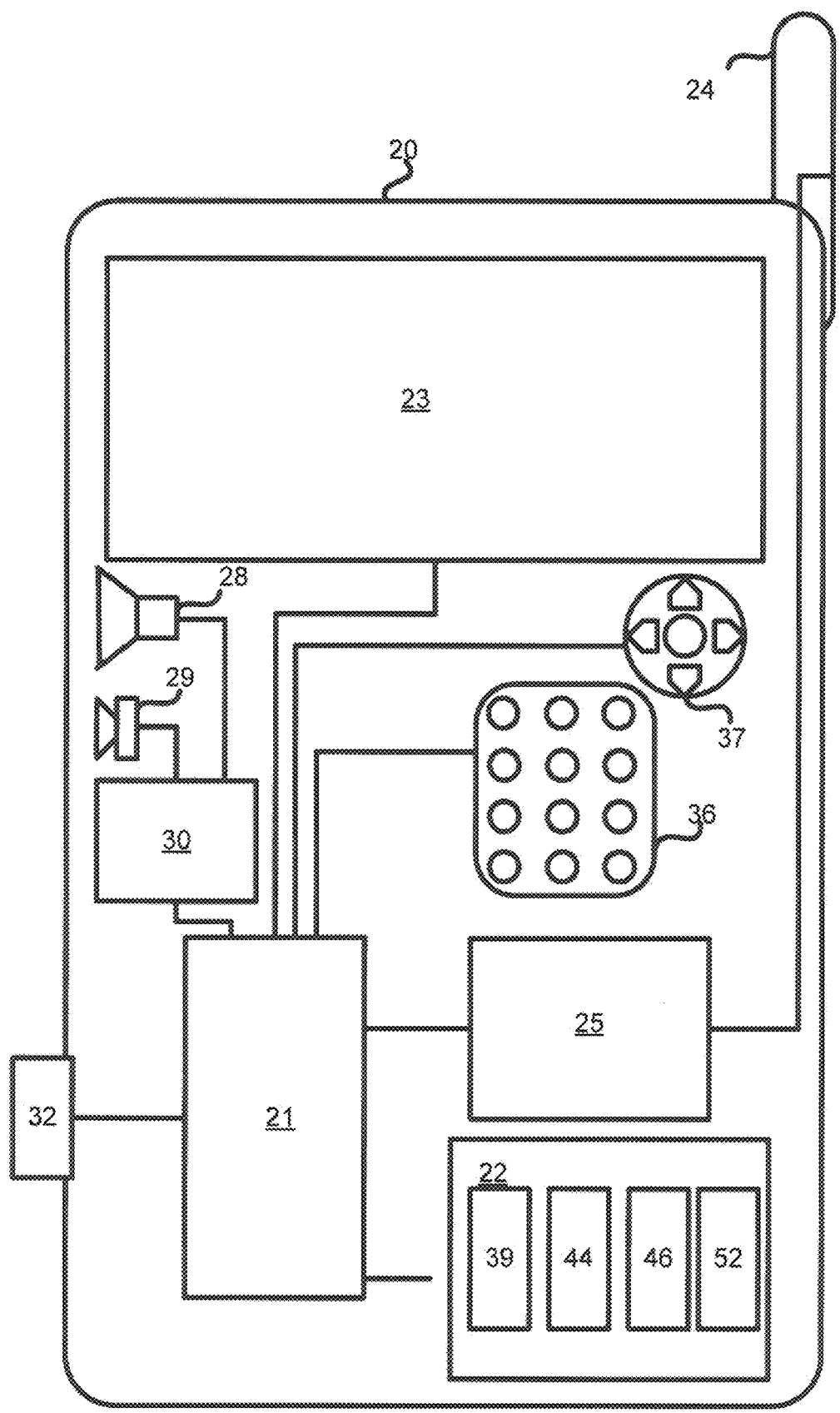
FIG. 1 is a component block diagram of an exemplary communication device capable of transcribing voice audio data into text data.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

The term "telephone" includes any telephonic communication device or system, including wired landline telephones, wireless cellular telephones, voice-over-Internet protocol (VOIP) phones, laptop computers with voice communications capability, and devices capable of supporting Internet phone services (e.g. Skype®).

As used herein, the terms "mobile handset," "handset," "mobile device" and "handheld device" refer to any one or all of cellular telephones, personal data assistants (PDA's), palm-top computers, wireless electronic mail receivers and cellular telephone receivers (e.g., the Blackberry® and Treo® devices), multimedia Internet enabled cellular telephones (e.g., the iPhone®), and similar personal electronic devices which include a programmable processor and memory and the capability to connect to a cellular or other wireless network.

The term "voice to text converter" or "speech to text converter" or "converter" or "voice to text transcriber" or "transcriber" includes any type of software or hardware system that can recognize human voice conversation and convert (i.e., transcribe) it to text data. The converter can provide a single text translation, or can provide a plurality of the most likely text translations. The embodiments are not limited to any particular type of voice to text converter.

The term "server" includes any computer, Internet server or cellular base station that provides telephonic connectivity for a user's telephone device. The server can be directly or indirectly connected to the user's telephone device by a wired or wireless connection.

The various embodiments provide methods and systems for enabling a mobile device or telephone user to have all or a portion of a conversation automatically transcribed into text data for storage on the mobile device. In an embodiment, by pressing a button or entering a command, a user can select a portion of the telephone conversation to be transcribed. In an embodiment, the selected portion of the conversation is transcribed at a server coupled to the cellular or regular telephone network, after which the server transmits the text data to the mobile device. Alternatively, the server may be accessible via the Internet by any of the mobile device, the cellular network or the regular telephone network. In an embodiment, the text can be scanned for phone numbers and/or address data (i.e. contact information). Such scanning may be performed at the server (such as before the text is transmitted) or within the mobile device (such as after the text has been received). The text data or extracted contact information may be transmitted to the mobile device in the form of a text message, such as a short message service (SMS) message, e-mail or via a cellular data transmission. The text data may be transmitted specially formatted so that it is automatically recognized by the mobile device and stored into address book memory.

The embodiment methods may be implemented on any of a variety of mobile devices, and on any of a variety of computing devices, including but not limited to desktop and laptop computers. FIG. 1 depicts various components of a mobile device 20 capable of supporting the various embodiments. Although the components of a mobile device 20 are illustrated, one of skill in the art would appreciate that the same or similar components may also be implemented in a computer (portable or otherwise) suitable for use with the various embodiments. The depiction of the mobile device 20 as a cellular telephone is merely for illustrative purposes. Also, the embodiments described above may be implemented on any device capable of supporting a voice conversation which includes the components illustrated in FIG. 1.

A typical mobile device 20 includes a processor 21 coupled to internal memory 22 and a user interface display 23. Additionally, the mobile device 20 may have an antenna 24 for sending and receiving electromagnetic radiation that is connected to a wireless data link and/or cellular telephone transceiver 25 coupled to the processor 21. In some implementations, the transceiver 25, and portions of the processor 21 and memory 22 used for cellular telephone communications are referred to as the air interface since together they provide a data interface via a wireless data link. Further, the mobile device 20 includes a speaker 28 to produce audible audio signals to the user, and a microphone 29 for receiving the audio speech of the user. Both the microphone 29 and speaker 28 may be connected to the processor 21 via a vocoder 30 which transforms the electrical signals into sound waves and vice versa. In some implementations, the vocoder 30 may be included as part of the circuitry and programming of the processor 21.

The processor 21 may be any programmable microprocessor, microcomputer or multiple processor chip or chips that can be configured by software instructions (applications) to perform a variety of functions, including the functions of the various embodiments described herein. In some mobile devices, multiple processors may be provided, such as one processor dedicated to wireless communication functions and one processor dedicated to running other applications.

Typically, software applications may be stored in the internal memory 22 before they are accessed and loaded into the processor 21. In some mobile devices, the processor 21 may include internal memory sufficient to store the application software instructions. For the purposes of this description, the term memory refers to all memory accessible by the processor 21, including internal memory 22 and memory within the processor 21 itself. The memory 22 may be volatile or nonvolatile memory, such as flash memory, or a mixture of both. In the various embodiments, the memory 22 may be configured with a buffer 39, and have stored within it voice to text converter software 44, contact information extraction software 46 and/or an address book 52.

Mobile devices 20 typically include a key pad 36 or miniature keyboard and menu selection buttons or rocker switches 37 for receiving user inputs. In addition, a mobile device 20 may include a transcription request button 32. In an embodiment, activation of the transcription request button 32 initiates the voice to text transcription process. It is noted that the button 32 is optional; activation of the audio to text conversion may be initiated via any other kind of computer interface input. One of skill in the art would appreciate that the voice to text software 44 may be activated by a variety of other means such as via a user interface menu shown on the display 23 key pad 36 in combination with menu selection buttons or rocker switches 37. In other examples, a voice to text conversion request can be provided to the mobile device 20 by pressing a series of keys on the keypad 36, by voice activation (i.e., speaking a particular prerecorded word or phrase), by activating accelerometers on the mobile device 20 (such as positioning or shaking the mobile device in a particular manner), by touching a touch screen display, or the like. For simplicity, the various embodiments will be described herein as being activated by the user pressing a transcription request button 32, for example, but such descriptions are not intended to be limiting to the use of a transcription request button 32.

In embodiments which include a transcription request button 32, the transcription request button 32 may be positioned on the mobile device 20 in an ergonomically convenient location to enable a user to activate the transcription process while engaged in a telephone conversation without having to look at the mobile device 20. For example, the transcription request button 32 may be positioned on the side of the mobile device 20 near where a user's fingers are normally positioned while holding the mobile device 20 to the ear. Some mobile devices include a button on the side used to initiate voice-activated dialing. Such a button is normally located in a position that would be ergonomically suitable for transcription activation as well. While the transcription request button 32 may located anywhere on mobile device 20, in an embodiment the transcription request button 32 is located on the side of mobile device 20 as shown in FIG. 1. For example, the transcription request button 32 is shown in FIG. 1 as being ergonomically positioned so that it can be operated by the user's little finger while the user is actively engaged in a conversation. In an alternative embodiment, a second transcription request button (not shown) may be located on the other side of the mobile device 20 (i.e., a transcription request button 32 is included on both sides of the device). By locating a two separate transcription request buttons on opposing side walls of the mobile device 20, a transcription request may be initiated by a finger on either hand so the user need not be listening to the conversation on a particular ear. In an embodiment, the transcription request button 32 initiates a transcription process as well as terminates the transcription process when the transcription request button 32 is depressed a second time during the same voice call. In an alternative embodiment, a second button (not shown) may be included on the mobile device to be used to terminate an active transcription request.

Figure 2:
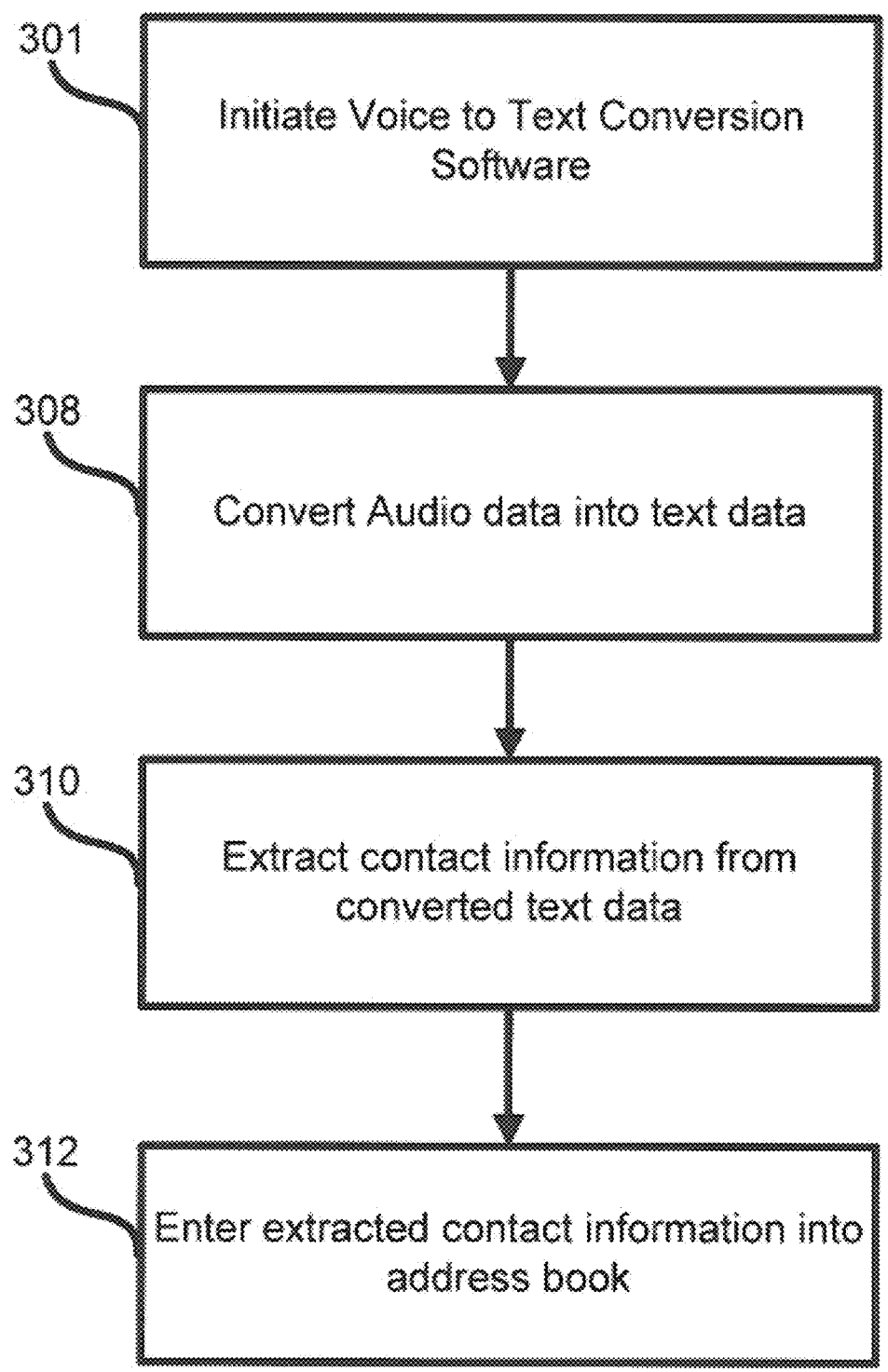
FIG. 2 is a process flow diagram of an embodiment method for transcribing voice audio data into text data within the communication device.

FIG. 2 is a process flow diagram of an example embodiment method for enabling a user to transcribe a portion or the entirety of an audio voice call into text data. When a user wishes to transcribe audio data to text data, the user activates the voice to text conversion software 44 stored in memory 22 such as by depressing a transcription request button 32; step 301. Typically, a user will press the transcription request button 32 during a telephone conversation, such as to capture an important detail (e.g., contact information). However, the voice to text conversion software 44 may also be activated before a conversation begins if the user desires to transcribe the voice conversation from the beginning. Once the voice to text software 44 is activated, the software can begin transcribing the conversation as it occurs, step 308. Alternatively, the voice to text conversion software 44 can transcribe a conversation stored in the memory buffer 39. After desired portions of the telephone conversation have been converted to text, the text can be scanned by contact information extraction software 46 to identify phone numbers, addresses and the like, step 310. Extracted contact information can then be stored in an address book 52 within the memory 22 of the mobile device 20, step 312. The step of storing the contact information in an address book 52 can be performed manually or automatically.

In embodiments where a user desires to convert audio data to text data during a voice call, the buffer 39 may be used to store some or all of a telephone conversation so that selected portions of the conversation can be converted to text. Using this embodiment, user can recapture and convert audio data into text data after it has been spoken. For example, the buffer 39 may be sized and configured to record for a duration selectable by the user, such as 5, 10, 30 60 or 300 seconds.

Figure 3:
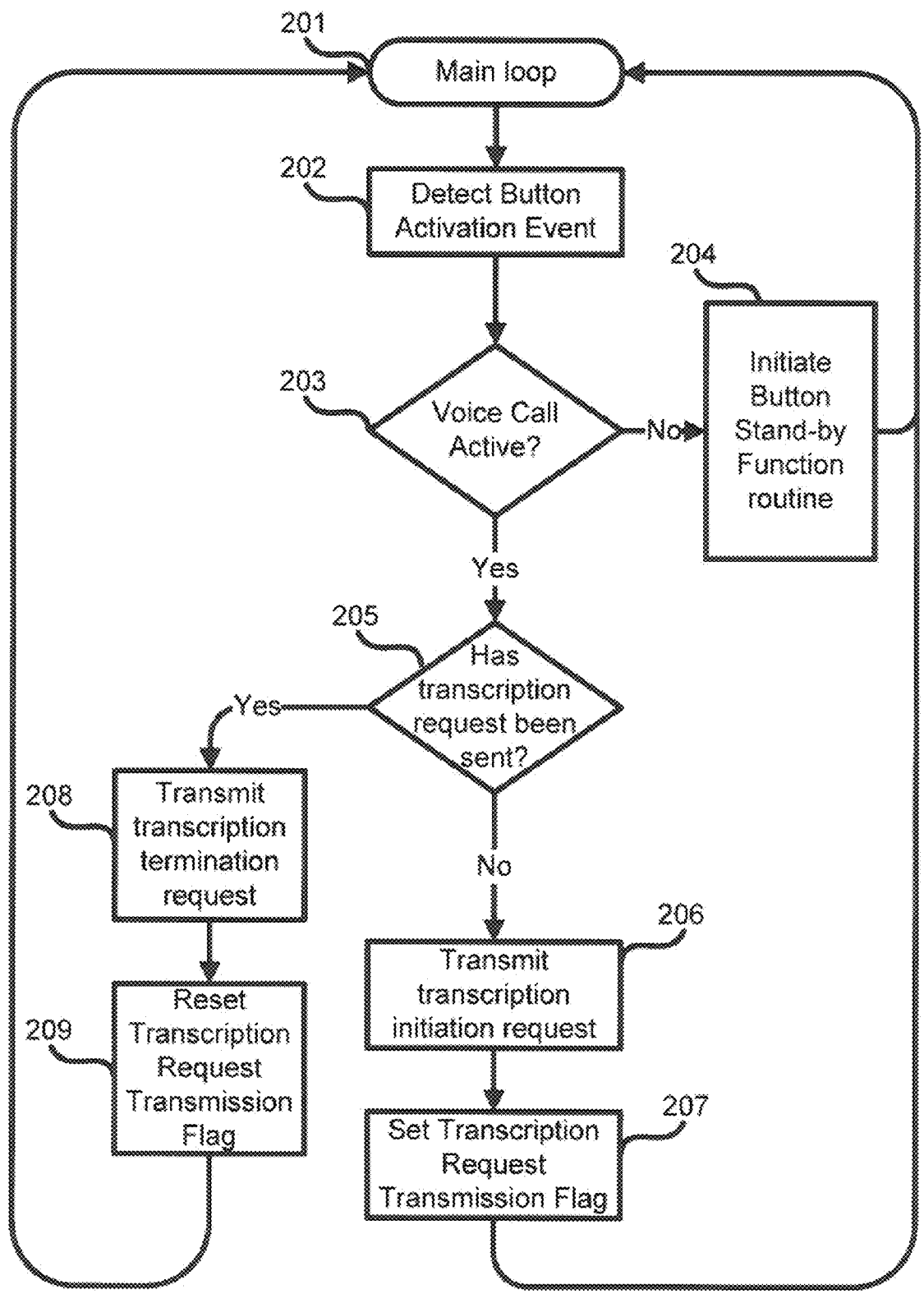
FIG. 3 is a process flow diagram of an embodiment method for initiating and terminating a transcription process in response to a transcription request button activation.

In embodiments where the transcription process is only activated during an on-going conversation, the transcription request button 32 may be a button that also has a different function when the mobile device 20 is in standby mode (i.e., not in an active voice conversation). FIG. 3 is a process flow diagram illustrating an example method for controlling the functionality of the transcription request button 32 depending upon the call status suitable for use with the various embodiments. In FIG. 3, the transcription request button 32 has a standby function controlled by another software application or routine, such as initiating voice-activated dialing. Depending upon the standby software application or routine associated implemented on the mobile device 20, the button 32 may be associated with any functionality that is not active during a voice conversation. Operating off the main loop 201, the processor 21 will detect a button press event, step 202, such as by detecting an interrupt flag associated with the button press. In response, the processor 21 may test a flag to determine if a call is active, test 203. If a call is not active (i.e., test 203="No"), a software routine providing the standby functionality of the button 32 is activated, step 204, before returning to the main loop 201. For example, the processor 21 may initiate a voice-activated dialing routine or application. However, if a call is active (i.e., test 203="Yes"), the processor 21 may test a transcription-requested flag to determine if a transcript request message has already been sent, test 205, and if not (i.e., test 205="No") transmit the audio to text conversion request message to a server 50, step 206, in accordance with one or more embodiments described herein. Upon sending the conversion request message (step 206), the processor 21 may also set the transcription-requested flag to indicate that the transcription process has been initiated, step 207. Setting this flag enables the processor 21 to determine if a server 50 is transcribing, since the software will be running on another computer and thus not directly accessible to the processor 21. Upon sending the conversion request message (step 206), the processor 21 returns to the main loop 201 until another transcription request button 32 press interrupt is detected. When the transcription request button 32 is pressed a second time during an active call, the processor 21 testing the transcription-requested flag will determine that a transcription request has already been made (i.e., Test 205="Yes"), and so the processor 21 will transmit a transcription termination request message to the server 50, step 208, and clear the transcription-requested flag, step 209, before returning to the main loop 201.

Figure 4:
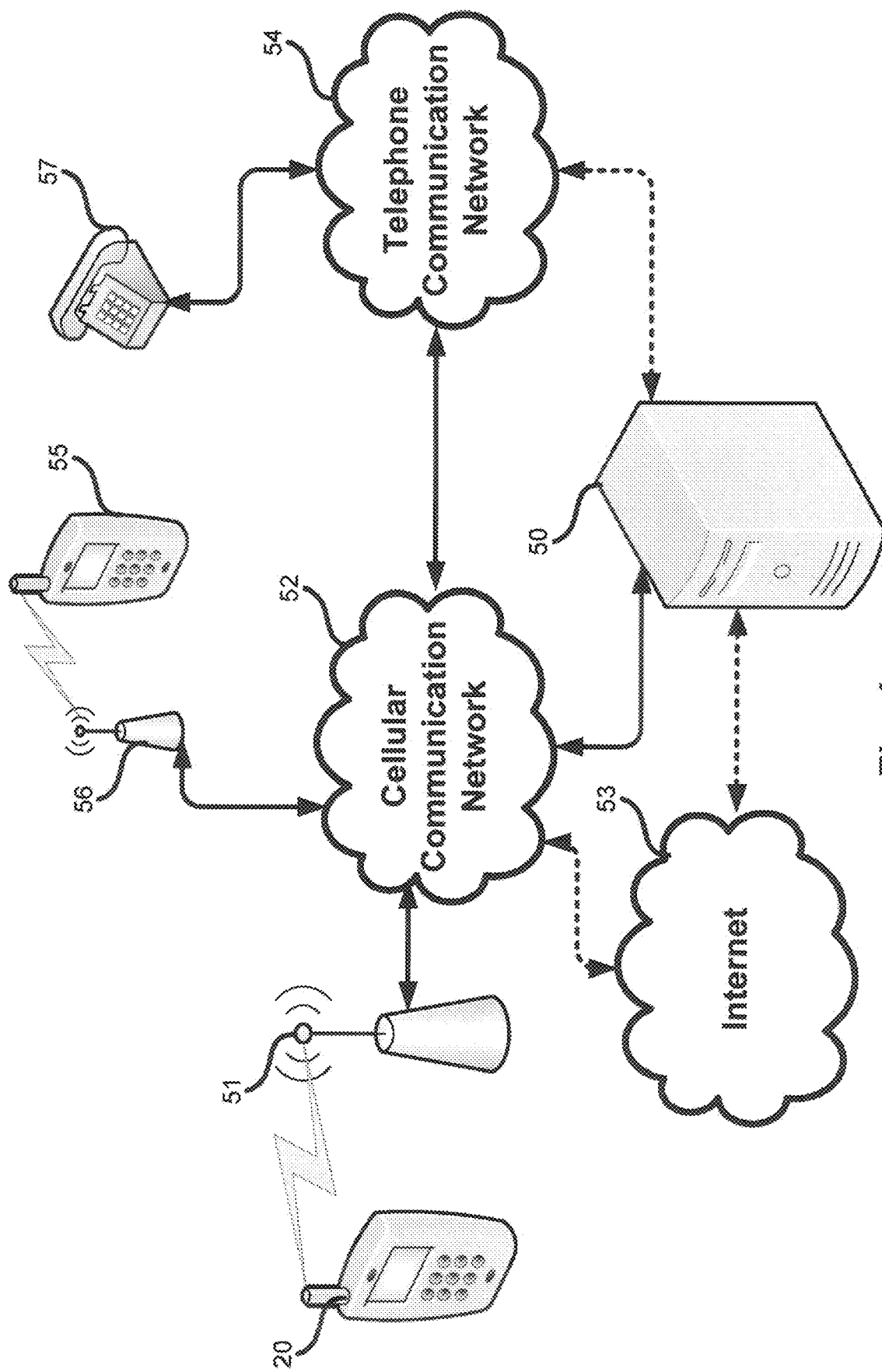
FIG. 4 is a system block diagram of an embodiment in which transcription is accomplished by a server.

In an alternative embodiment, the process of converting the audio to text data is performed in a server 50 coupled to a network with the telephone conversation. Offloading the transcription process to a server 50 conserves battery and processor power of the mobile device 20. FIG. 4 illustrates an example embodiment system capable of transcribing some or all of a voice conversation taking place on a mobile device 20 at a server 50. The system includes a mobile device 20 communicating via a cellular base station antenna 51 connected to a cellular network 52 to another mobile device 55 or telephone 57. Communications with the other mobile device 55 may proceed via another base station 56, while communications with a conventional telephone 57 may proceed over a conventional telephone communication network 54. A server 50 is connected to the cellular communication network 52, the conventional telephone network 54 or another communication network, such as the Internet 53. In various embodiments, the server 50 may be located at a cellular base station 51, within a switching center of the cellular communication network 52, within a switching center of the convention telephone network 54, or in any other location with access to a network by which telephone conversation audio data can be provided. In implementations in which the server 50 is coupled to the Internet, another Internet-connected server (not shown) may be included within the cellular communication network 52 or telephone communication network 54 to route audio data to the server 50 for transcription. Once a voice call is established, a user of the mobile device 20 (or 55 for that matter) may activate the voice to text conversion process at any time. When activated, audio data from the telephone conversation is also sent to the server 50 where it can be stored and transcribed as described herein.

Figure 5:
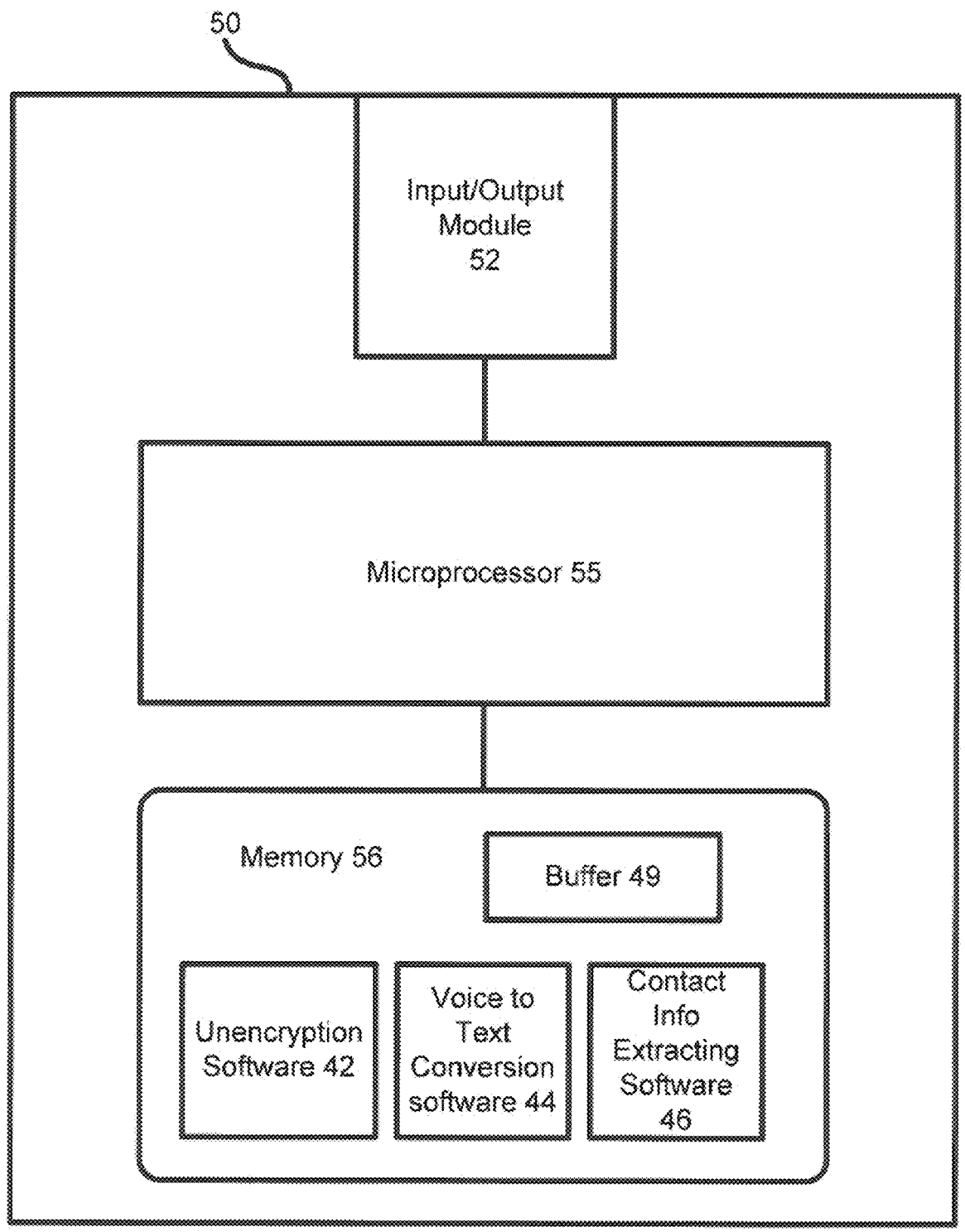
FIG. 5 is a component block diagram of an exemplary server suitable for use in an embodiment.

FIG. 5 is a component block diagram of an illustrative server 50 for use in the embodiment system shown in FIG. 4. The server 50 includes an input/output port 52 for communicating data in and out of the server, such as a modem or similar network interface for connecting to a network (e.g., the Internet 53 or communication networks 52, 54). The server 50 includes a processor 55 (e.g., a microprocessor) in communication with the input/output port 52, and in communication with a computer readable memory 56. Stored within the memory 56 may be telephone signal decryption software 42 and voice to text conversion software 44. In an embodiment the memory 56 may also include contact information extraction software 46. The memory 56 may also include a buffer 49 segment or partition configured for temporarily storing portions or the entirety of a telephone conversation. The telephone conversation may be buffered in encrypted or unencrypted form.

The decryption software 42 may be needed to convert telephone data into a form of audio data that can be processed by the voice-to-text conversion software 44. Typically, telephone signals are transmitted over cellular and telephone networks 52, 54 as digital data organized into data packets. (While plain ordinary telephone (POTS) signals are transmitted as analog signals to/from residences, such signals are quickly converted to digital data that are transmitted via multiplexed fiber optic and copper trunk lines). The digital data may be compressed and packetized in code-division multiple access (CDMA) data packets. Such digital data may be unreadable to many voice to text conversion software 44 applications, and thus must be converted to a recognizable audio data format before transcription can begin.

The voice to text converter software 44 can be any kind or brand of software or system for converting human speech to text. Many different kinds and brands of such software are commercially available. It is noted that the decryption software 42 and voice to text converter 44 can be combined into a single software package or application.

In addition to converting data formats, the server 50 may need to confirm that transcription is authorized. In some situations and political regions privacy laws prevent the unauthorized decryption of the telephone conversations. In these cases, prior authorization from the user may be required before the voice to text conversion software 44 can be activated for a particular user. In some situations, a user requesting text conversion request by pressing a conversion request button 39 on the user's mobile device 20 may be construed as specific authorization to decrypt the user's telephone conversation. In other situations, the server 50 may also need to obtain authorization from the other member of the telephone conversation (e.g., by the pressing of a conversion request button 32 on the other user's mobile device 55).

In an embodiment, the decryption software 42 and/or voice to text converter 44 can be implemented as hardware or a hardware/software combination instead of software stored in the server memory 56. Both hardware and software implementations of the decryption software 42 and converter 44 are within the scope of the claims.

Contact information extraction software 46 can be implemented on the server 50 to scan converted text for phone numbers, addresses, email addresses or the like. For example, phone numbers can be recognized and extracted by scanning the text for known area code numbers, or sequences of 7 or 10 digits. Address information can be recognized by scanning the text for words commonly associated with address information, such as "street", "avenue", "road", "PO Box", known cities or states or the like. Email addresses can be recognized by scanning the text for known email service providers (e.g., Gmail.com, yahoo.com, hotmail.com), the word "email", or the "@" word, which of course will appear as the word "at" in the text. Once a number, address, email address or other contact information is recognized, the software can use simple rules to delineate the information (i.e., determine where the recognized data starts and ends within the text), and then copy the delineated information into memory. If contact information is successfully extracted, it can be identified for or transmitted to the mobile device 20 user, and, optionally, automatically entered into the correct fields in the address book on the user's mobile device 20. The entry of extracted data into appropriate memory fields may be performed by the mobile device 20 using received extracted contact data. In implementations where users' address books are maintained on the server 50, as may be the case in large organizations with server-backed up systems, the extracted text can be stored in the appropriate fields of the address book maintained on the server 50. The user's mobile device 20 can then be updated with the latest version of the address book containing the extracted contact information the next time the mobile device 20 is "synched" with the server 50. Text data unrelated to contact information may then be discarded.

In an embodiment, the server buffer 49 may be used to temporarily store (i.e., buffer) the telephone conversation when the conversation is over (or while pausing the conversation). This embodiment enables users to select portions of the telephone conversation for conversion to text after the conversation ends. In this manner, the embodiment method allows users to recapture and convert audio data into text data after it has been spoken. The buffer duration may selectable by the user or by the server operator and may be of any length.

Figure 6:
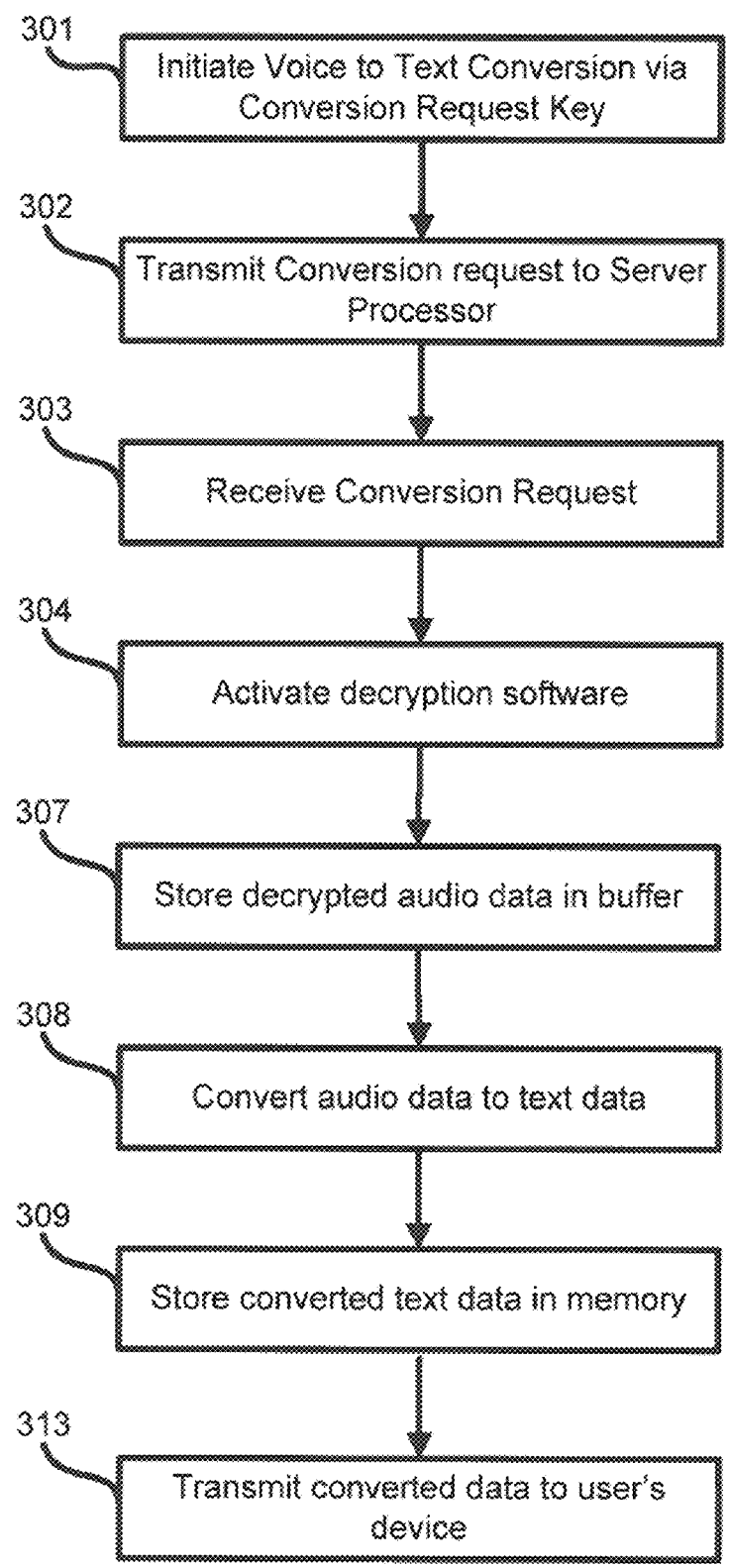
FIG. 6 is a process flow diagram of an embodiment method for transcribing voice audio data into text data at a server.

FIG. 6 is a process flow diagram which illustrates an embodiment method for converting portions or the entirety of the audio data of a telephone conversation to text on a server 50. As discussed above with reference to FIG. 2, when a user wishes to convert audio data to text data, the user may press a transcription request button 32 (or other method of activating the process described above), step 301. Once a text conversion request is made by the user, the request is transmitted to the server 50 by the mobile device 20, step 302. The text conversion request can be sent as a data packet during the telephone conversation, or may be sent as a special tone or series of tones that can be recognized as constituting the request command. The server 50 receives the text conversion request from the mobile device 20 via input/output port 52, step 303. In some embodiments, the text conversion request may be recognized by a processor or server within the cellular telephone communication network 52 or the conventional telephone communication network 54, prompting the processor or server to forward the request and the telephone conversation data to the server 50, such as via the Internet 53. In instances where the mobile device 20 is a wireless communication device, the transmission of the text conversion request is first received by base station antenna 51 and is communicated to the server 50. In response to the received text conversion request, the server 50 may activate decryption software 42 to begin converting received communication data into a data format the can be transcribed, step 304. Portions of the voice conversation, in either original or decrypted data formats, may be temporarily stored in a buffer 49, step 307. Once audio data has been decrypted, the server processor 55 may activate the voice to text conversion software 44 and begin transcribing the conversation, step 308. The voice to text conversion can begin at the time the conversion request is received at the server. If the all or part of the conversation is stored in a server buffer 49, such as in response to a command from the user, conversion can begin at any point in the stored conversation, such as by using time to designate the starting point or the user listening to the recorded conversation and designating when transcription should begin.

In an embodiment, the telephone conversation can be stored in a server buffer 49 as the conversation proceeds without the user requesting transcription, thereby allowing transcription to be initiated when the user recognizes the need. In this embodiment, the server 50 may store a portion of the telephone conversation in a buffer 49 so that a user can initiate the text conversion service on a portion of the telephone conversation that has just occurred. For example, the server 50 and buffer 49 can be configured to store audio data in a first-in first-out (FIFO) buffer spanning a limited period of time such as, for example, 30 to 60 seconds. Then, if a user hears something that the user would like transcribed, such as the other party reads off the winning lottery number or says an address or telephone number, the user can immediately request transcription (e.g., by pressing a button 32 on the mobile device 20) of the conversation data stored in the buffer 49. In this embodiment, users do not need to decide in advance that they will transcribe part of a telephone conversation and do not have to ask the other party to repeat themselves. In order to protect privacy and to comply with telecommunication laws, both members of the conversation may need to be informed of the partial recording and the buffer 49 may need to be purged immediately if the user does not request transcription.

Once activated, the voice to text conversion software 44 may continue converting audio data into text data until the telephone call terminates or a conversion termination signal is received by the server 50. A user may terminate the voice to text conversion process before the voice conversation ends for a variety of reasons. For example, a user may wish to only convert a telephone number or address that is spoken during the conversation rather than an extended portion of the conversation. In an embodiment, the user may transmit a voice to text conversion termination signal by depressing the button 32 a second time during the voice conversation. Alternatively, the voice to text software 44 may be terminated by a variety of other means such as via a user interface menu shown on the display 23 key pad 36 in combination with menu selection buttons or rocker switches 37, multiple button pushes, voice activation commands (e.g., by speaking "stop transcription"), and the like.

Once the voice to text conversion software 44 is terminated, the newly converted text data can be stored in a server memory 56 location that is associated with the user who initiated the voice to text conversion, step 309. Once stored in memory 56, the converted text data may be made retrievable by a user at any time via a network, such as the Internet 53 using well known data access techniques.

The converted text may also be transmitted to the user's mobile device 20 or other communication device via a wired or wireless data communication link, step 313. The text data can be transmitted as a text message (e.g., SMS or e-mail message) or as any other type of data transmission file containing the text. Alternatively, the converted text data may be transmitted back to the mobile device 20 in real time thereby obviating the need to store the text data at the server 50 (step 309). In such an alternative embodiment, the voice to data conversion software 44 may generate data packets for transmission back to the mobile device 20 as the voice audio data is converted to text.

Once the voice to text conversion method terminates, the user may manually extract selected portions, such as those parts of the text that contain contact information, and manually enter the selected information into an address book 52 or otherwise store the text in the mobile device's memory 22. For example, users may use copy and paste application tools provided on the mobile device 20 to copy selected words or numbers and then paste them into the appropriate fields in an address book record. In embodiments in which the user accesses the text data stored on the server 50, such as via the Internet 53, the user may use browser tools to copy selected portions of the text and then "paste" or otherwise load the selections into the mobile device's memory 22 using well known application tools.

Figure 7:
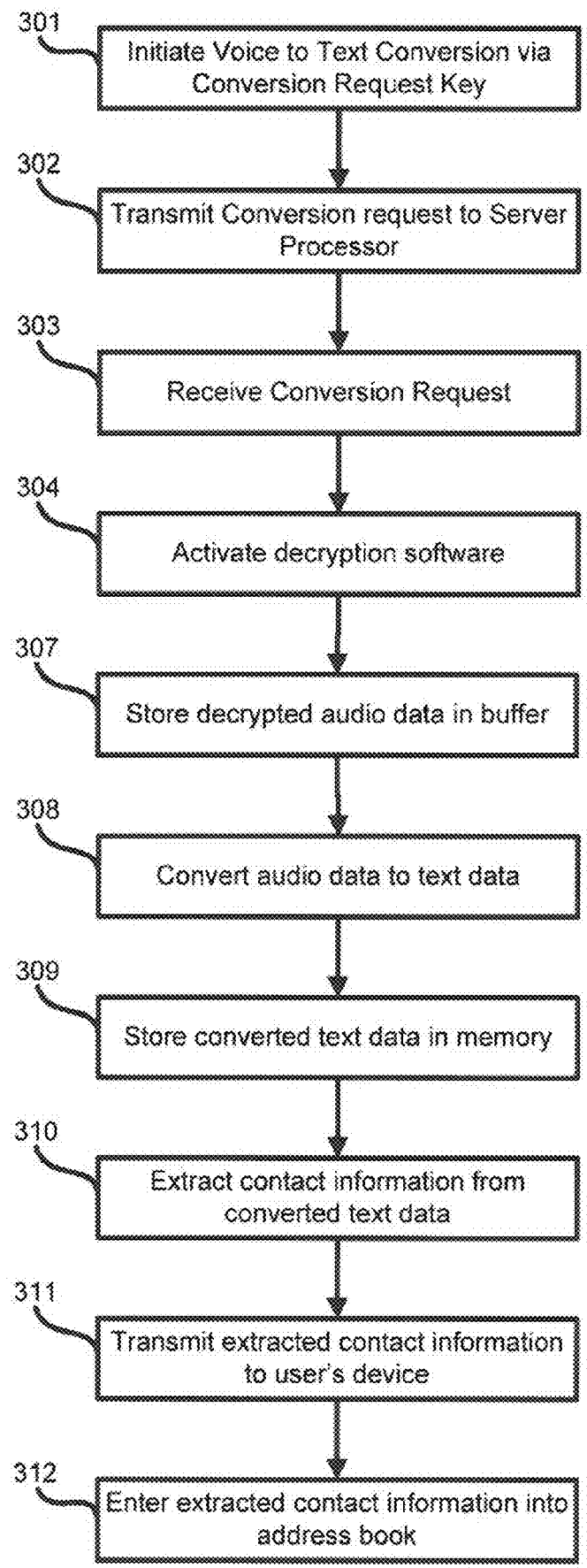
FIG. 7 is an alternative process flow diagram of an embodiment method for transcribing voice audio data into text data at a server.

In an alternative embodiment, the server 50 may be configured with software to extract contact information and automatically communicate the selections to the user's mobile device 20, an example of which is illustrated in FIG. 7. The embodiment illustrated in FIG. 7 includes the step 301-304 and 307-309 described above with reference to FIG. 6. Additionally, the server 50 is configured with software to recognize and extract contact information from the converted text data, step 310, and automatically transmit the extracted contact information to the mobile device 20, step 311, for storage into memory 22. As discussed above, a server 50 may have stored in its memory 55 contact information extraction software 46 which is designed to scan converted text for phone numbers, addresses, email addresses or the like. As described above, phone numbers can be recognized by scanning for known area code numbers, or sequences of 7 or 10 digits, address information can be recognized by scanning the text for words associated with address information (e.g., "street", "avenue", "road", "PO Box", known cities or states or the like), and Email addresses can be recognized by scanning the text for known email service providers (e.g., Gmail.com, yahoo.com, hotmail.com), the word "email", standard address extensions (e.g., ".com", ".org", ".net", ".gov", ".uk", ".ca", ".jp", etc.) or "at" proceeding a period or "dot". Text data unrelated to contact information may be discarded or retained in memory as the user may designate or elect. Thus, after converted text data is stored in memory 56, step 309, the server 50 processor 55 may activate the contact information extraction software 46 to extract all contact information from the converted text data, step 310. The extracted contact information may be transmitted to the user's mobile device 20, step 311. The mobile device 20 may also be configured with application software to receive the transmitted contact information and then to automatically enter the information into an address book stored in memory 22, step 312.

In an alternative embodiment, the server 50 only converts into text data the portion of the audio that is directed toward the mobile device 20 user activating the transcription service (i.e. the mobile device 20 that transmitted the text conversion request). In other words, voice audio data spoken into the mobile device 20 and picked up by microphone 29 is not converted to text. In many cases, the mobile device 20 user has no need or desire to transcribe the user's own words. This embodiment may be used to reduce the transcription processing and the quantity of text received by the mobile device 20. This embodiment may be accomplished by informing the server 50 of the originating device as part of each data packet routed to the server. Alternatively, only one side of the conversation may be routed to the server 50 for transcription, such as by the cellular communication network 52 transmitting only audio data received from the other part (e.g., mobile device 55 or telephone 57 illustrated in FIG. 4).

Figure 8:
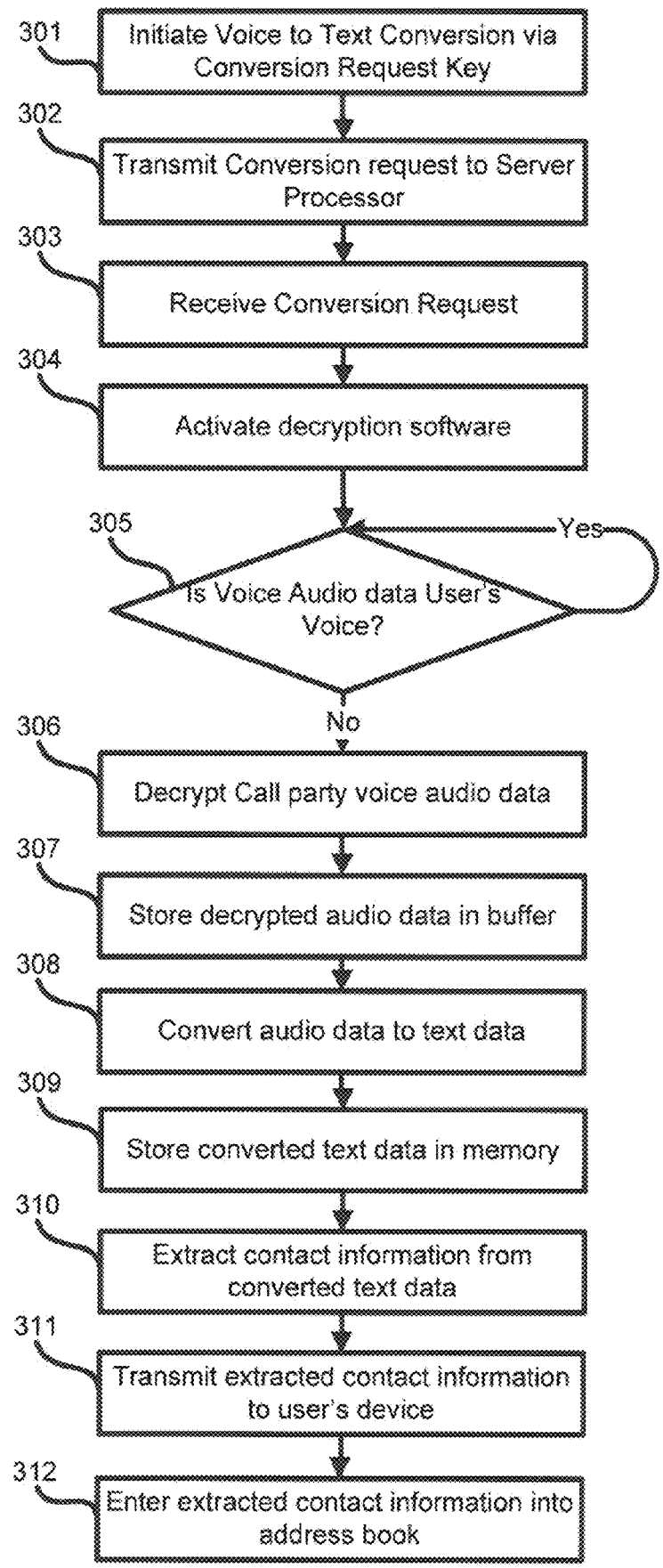
FIG. 8 is another alternative process flow diagram of an embodiment method for transcribing voice audio data into text data at a server.

In a further embodiment illustrated in FIG. 8, the server 50 may be configured with software to recognize the user's voice and speech pattern and thereby transcribe only the other party's speech. In the alternative embodiment, only the words spoken by the other party (i.e., not by the owner of the mobile device 20 that requested transcription) are converted to text. This embodiment may implement method steps 301-304 describing above with reference to FIGS. 6 and 7. In addition, the server 50 processor 55 is configured with software to monitor the voice conversation to determine the origin of the voice audio data. The server 50 may determine the origin of audio data packets by comparing origination address information in audio data packets to the address of the device that made the conversion request (step 301), (e.g., by using origination addresses within data packet headers). Alternatively, the user may train the server 50 to recognize the user's voice, so that the server 50 can identify the user's voice in a conversation, step 305. Users may train the server 50 in a manner similar to how speech-to-text conversion software programs can be trained, such as by placing a voice call to the server 50 and reading a particular portion of text into the user's mobile device 20. So trained, the server 50 can monitor words spoken during the voice conversation by comparing the audio data to the user's voice patterns stored in the server's memory 56, step 305. If voice audio data packets originate from the user's mobile device 20 (i.e., Test 305="Yes"), then the server 50 waits for the next voice audio data packet. If, however, voice data packets do not originate from the user's mobile device 20 (i.e., Test 305="No"), the server 50 decrypts and transcribes the voice data packets, completing the voice audio data, step 306 and performs steps 306-312 as described above with reference to FIGS. 6 and 7. In this manner, only the other party's words will be transcribed and delivered to the user's mobile device 20.

In some embodiments it may be necessary for users to register their mobile devices with a server 50 that performs the transcription process. Such a server 50 may be part of a transcription service operated and marketed by a cellular telephone carrier, a conventional telephone system provider or an independent service provider. By registering their mobile devices with the server 50, users can inform the server of the type of messaging technology to be used for transmitting text data to their mobile devices, as well as the address to use for such messaging. Additionally, users can confirm to the server 50 then they want their conversations to be transcribe and designate requirements or restrictions on the service. For example, the user may require that the user speak or otherwise enter a password in order to initiate the transcription service. Requiring entry of their own unique password before transcriptions begins would allow users to avoid unauthorized or inadvertent transcriptions. Also, users may designate whether the transcription should be two-way (i.e., transcribing both parties) or one way (i.e., transcribing only one party) as described above. Users may also train the server 50 to recognize their voice as part of a registration process, such as by reading a portion of text to the server 50 using their mobile device 20. Users may also provide the server 50 with information to enable it to transmit text data to more than one mobile device, or save the text data in server memory in a location accessible by users via a network, such as the Internet 53.

In some instances users may own more than one mobile device or may borrow a mobile device and then want to transcribe part of their telephone conversation. To accommodate such situations, the conversion of a conversation into text data may be initiated on one mobile device with the transcribed text transmitted to a second mobile device for storage in memory. In an embodiment, the transcribed text may be transmitted from one mobile device to the other by any known messaging application, such as SMS and e-mail messaging. In another embodiment, the server 50 may transmit the text directly to the second mobile device if that device has been registered with the server 50 (i.e., the server 50 knows the address of the mobile device). In an embodiment, the text data may be sent to all mobile devices owned by a user who has registered with the server 50.

For example, if a user owns a mobile device 20 and a cellular telephone integrated into the user's automobile, the user may implement the transcription process while driving, such as to obtain the e-mail address of a person on the other end of the telephone conversation. The transcription software may run on the car's integrated cell phone or another processor, or the software may be executed in a server 50 as described above. If the transcription software is performed on a server 50, then the server 50 can transmit the converted text data to the car's integrated cell phone, where it may be added to an address of the user stored in the memory of the car's built-in cell phone. Alternatively or in addition, the server 50 may transmit the text data to the user's mobile device 20 using an address provided to the server 50 during registration. The car's built-in cell phone may also be configured to automatically forward the received text data to the user's mobile device 20.

As a second example, a user may borrow the mobile device 55 of another and wish to transcribe a portion of a conversation, such as to capture contact information. In this example, the server 50 may be configured to automatically transmit the converted text data to the user's mobile device 20 using a messaging technology and address provided to the server 50 during registration. As these examples illustrate, locating the transcription software on the server 50 provides greater flexibility for users who may have more than one mobile device 20 or need to implement the transcription service from a different telephone device.

The various embodiments are especially useful for mobile device users who need to capture information from telephone conversations. The various embodiments obviate the need for pen and paper to record telephone numbers and addresses while using a mobile device.

The various embodiments can be used to verbally program the address books stored on their mobile device 20. For example, if a user would like to store a phone number or address in an address book, the user can press the audio to text converter request button (which will activate the text converter), and then speak into the mobile device. As described above, voice signals will be transmitted to the server and converted to text data, and the text data can be transmitted back to the user's mobile device 20. This method may be useful when users wants to input phone numbers and the like without manual text entry.

The hardware used to implement the forgoing embodiments may be processing elements and memory elements configured to execute a set of instructions, wherein the set of instructions are for performing method steps corresponding to the above methods. Alternatively, some steps or methods may be performed by circuitry that is specific to a given function.

Those of ordinary skill in the art will appreciate that the various illustrative logical blocks, modules, circuits, and algorithm steps described in connection with the embodiments may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware, firmware, or software depends upon the particular application and design constraints imposed on the overall system. Those of ordinary skill in the art may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. The software module may reside in a processor readable storage medium and/or processor readable memory both of which may be any of RAM memory, flash memory, ROM memory, EPROM memory, EEPROM memory, registers, hard disk, a removable disk, a CD-ROM, or any other tangible form of data storage medium known in the art. Moreover, the processor readable memory may comprise more than one memory chip, memory internal to the processor chip, in separate memory chips, and combinations of different types of memory such as flash memory and RAM memory. References herein to the memory of a mobile device are intended to encompass any one or all memory modules within the mobile device without limitation to a particular configuration, type, or packaging. An exemplary storage medium is coupled to a processor in the mobile device such that the processor can read information from, and write information to, the storage medium. In the alternative, the storage medium may be integral to the processor. The processor and the storage medium may reside in an ASIC.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

I claim:

1. A method for transcribing a telephone conversation, comprising:

receiving a transcription request from a mobile device at a server connected to the mobile device;

receiving audio data from the telephone conversation at the server;
monitoring packets of audio data to determine their origin;
identifying an origin of the audio data;
decrypting at least a portion of the audio data in the server, wherein the portion of the audio data decrypted is limited to audio data originating from a party other than the mobile device;
transcribing the decrypted audio data into text data in the server; and
transmitting at least a portion of the text data from the server to the mobile device.

2. The method of claim 1, further comprising:
buffering at the server a portion of the audio data; and
transcribing the buffered audio data into text data at the server.

3. The method of claim 1, further comprising:
receiving the transmitted at least a portion of the text data at the mobile device; and
storing the received text data in memory of the mobile device.

4. The method of claim 3, wherein the text data is stored in an address book in the mobile device.

5. The method of claim 1, further comprising extracting contact information from the transcribed text data, wherein only the extracted contact information is transmitted from the server to the mobile device.

6. A server, comprising:
a server processor;
a network interface coupled to the server processor; and
a memory coupled to the server processor,
wherein the server processor is configured with software instructions to perform operations comprising:
receiving via the network interface a transcription request from a mobile device;
receiving via the network interface audio data from a telephone conversation;
monitoring packets of audio data to determine their origin;
identifying an origin of the audio data,
decrypting at least a portion of the audio data, wherein the portion of the audio data decrypted is limited to audio data originating from a party other than the mobile device;
transcribing the decrypted audio data into text data; and
transmitting via the network interface at least a portion of the text data to the mobile device.

7. The server of claim 6, wherein the server processor is configured with software instructions to perform operations further comprising:
buffering a portion of the audio data; and
transcribing the buffered audio data into text data.

8. The server of claim 6, wherein the server processor is configured with software instructions to perform operations further comprising extracting contact information from the transcribed text data, wherein only the extracted contact information is transmitted to the mobile device.

9. A server, comprising:
means for receiving a transcription request from a mobile device via a network;
means for receiving audio data from a telephone conversation;
means for monitoring packets of audio data to determine their origin;
means for identifying an origin of the audio data;
means for decrypting at least a portion of the audio data, wherein the portion of the audio data decrypted is limited to audio data originating from a party other than the mobile device;
means for transcribing the decrypted audio data into text data; and
means for transmitting at least a portion of the text data from the server to the mobile device.

10. The server of claim 9, further comprising
means for buffering a portion of the audio data; and
means for transcribing the buffered audio data into text data at the server.

11. The server of claim 9, further comprising means for extracting contact information from the transcribed text data, wherein only the extracted contact information is transmitted from the server to the mobile device.

12. A non-transitory processor-readable storage medium having stored therein server-executable software instructions configured to cause a server processor to perform operations comprising:
receiving a transcription request from a mobile device;
receiving audio data from a telephone conversation;
monitoring packets of audio data to determine their origin;
identifying an origin of the audio data,
decrypting at least a portion of the audio data, wherein the portion of the audio data decrypted is limited to audio data originating from a party other than the mobile device;
transcribing the decrypted audio data into text data; and
transmitting at least a portion of the text data to the mobile device.

13. The non-transitory processor-readable storage medium of claim 12, wherein the stored server-executable software instructions are configured to cause the server to perform operations further comprising:
buffering a portion of the audio data; and
transcribing the buffered audio data into text data.

14. The non-transitory processor-readable storage medium of claim 12, wherein the stored server-executable software instructions are configured to cause the server to perform operations further comprising extracting contact information from the transcribed text data, wherein only the extracted contact information is transmitted to the mobile device.

15. A method for transcribing a telephone conversation, comprising:
receiving a transcription request from a mobile device at a server connected to the mobile device;
receiving audio data from the telephone conversation at the server;
comparing audio data to a user voice profile store in memory of the server;
identifying audio data matching the user voice profile;
decrypting at least a portion of the audio data in the server, wherein the portion of the audio data decrypted is limited to audio data not matching the user voice profile;
transcribing the decrypted audio data into text data in the server; and
transmitting at least a portion of the text data from the server to the mobile device.

16. The method of claim 15, further comprising
buffering at the server a portion of the audio data; and
transcribing the buffered audio data into text data at the server.

17. The method of claim 16, further comprising extracting contact information from the transcribed text data, wherein only the extracted contact information is transmitted from the server to the mobile device.

18. A server, comprising:
a server processor;
a network interface coupled to the server processor; and
a memory coupled to the server processor,
wherein the server processor is configured with software instructions to perform operations comprising:
receiving via the network interface a transcription request from a mobile device;
receiving via the network interface audio data from a telephone conversation;
comparing audio data to a user voice profile store in the memory;
identifying audio data matching the user voice profile;
decrypting at least a portion of the audio data, wherein the portion of the audio data decrypted is limited to audio data not matching the user voice profile;
transcribing the decrypted audio data into text data; and
transmitting via the network interface at least a portion of the text data to the mobile device.

19. The server of claim 18, wherein the server processor is configured with software instructions to perform operations further comprising:
buffering a portion of the audio data; and
transcribing the buffered audio data into text data.

20. The server of claim 18, wherein the server processor is configured with software instructions to perform operations further comprising extracting contact information from the transcribed text data, wherein only the extracted contact information is transmitted to the mobile device.

21. A server, comprising:
means for receiving a transcription request from a mobile device via a network;
means for receiving audio data from a telephone conversation;
means for comparing audio data to a user voice profile store in memory of the server;
means for identifying audio data matching the user voice profile;
means for decrypting at least a portion of the audio data, wherein the portion of the audio data decrypted is limited to audio data not matching the user voice profile;
means for transcribing the decrypted audio data into text data; and
means for transmitting at least a portion of the text data to the mobile device.

22. The server of claim 21, further comprising:
means for buffering a portion of the audio data; and
means for transcribing the buffered audio data into text data.

23. The server of claim 21, further comprising means for extracting contact information from the transcribed text data, wherein only the extracted contact information is transmitted from the server to the mobile device.

24. A non-transitory processor-readable storage medium having stored therein server-executable software instructions configured to cause a server processor to perform operations comprising:
receiving a transcription request from a mobile device;
receiving audio data from a telephone conversation;
comparing audio data to a user voice profile store in memory of the server;
identifying audio data matching the user voice profile;
decrypting at least a portion of the audio data, wherein the portion of the audio data decrypted is limited to audio data not matching the user voice profile;
transcribing the decrypted audio data into text data; and
transmitting at least a portion of the text data to the mobile device.

25. The non-transitory processor-readable storage medium of claim 24, wherein the stored server-executable software instructions are configured to cause the server to perform operations further comprising:
buffering a portion of the audio data; and
transcribing the buffered audio data into text data.

26. The non-transitory processor-readable storage medium of claim 24, wherein the stored server-executable software instructions are configured to cause the server to perform operations further comprising extracting contact information from the transcribed text data, wherein only the extracted contact information is transmitted to the mobile device.

27. A method for transcribing a telephone conversation on a mobile device, comprising:
receiving a transcription activation indication on the mobile device;
receiving audio data from the telephone conversation;
monitoring packets of audio data to determine their origin;
identifying an origin of the audio data;
decrypting at least a portion of the audio data, wherein the portion of the audio data decrypted is limited to audio data originating from a party other than the mobile device; and
transcribing the decrypted audio data into text data.

28. The method of claim 27, further comprising:
buffering a portion of the audio data; and
transcribing the buffered audio data into text data.

29. The method of claim 27, further comprising:
storing the transcribed text data in a memory of the mobile device.

30. The method of claim 29, wherein the text data is stored in an address book in the mobile device.

31. The method of claim 27, further comprising extracting contact information from the transcribed text data.

32. A method for transcribing a telephone conversation on a mobile device, comprising:
receiving a transcription activation indication at the mobile device;
receiving audio data from the telephone conversation;
comparing audio data to a user voice profile store;
identifying audio data matching the user voice profile,
decrypting at least a portion of the audio data, wherein the portion of the audio data decrypted is limited to audio data not matching the user voice profile; and
transcribing the decrypted audio data into text data at the mobile device.

33. The method of claim 32, further comprising
buffering a portion of the audio data; and
transcribing the buffered audio data into text data at the mobile device.

34. The method of claim 32, further comprising:
storing the transcribed text data in a memory of the mobile device.

35. The method of claim 34, wherein the text data is stored in an address book in the mobile device.

36. The method of claim 32, further comprising extracting contact information from the transcribed text data at the mobile device.

37. A mobile device, comprising:
a mobile device processor;
a network interface coupled to the mobile device processor; and
a memory coupled to the mobile device processor,
wherein the mobile device processor is configured with software instructions to perform operations comprising:

receiving a transcription activation indication;
receiving audio data from a telephone conversation;
monitoring packets of audio data to determine their origin;
identifying an origin of the audio data,
decrypting at least a portion of the audio data, wherein the portion of the audio data decrypted is limited to audio data originating from a party other than the mobile device; and
transcribing the decrypted audio data into text data.

38. The mobile device of claim 37, wherein the mobile device processor is configured with software instructions to perform operations further comprising:
buffering a portion of the audio data; and
transcribing the buffered audio data into text data.

39. The mobile device of claim 37, wherein the mobile device processor is configured with software instructions to perform operations further comprising:
storing the transcribed text data in a memory of the mobile device.

40. The mobile device of claim 39, wherein the text data is stored in an address book in the mobile device.

41. The mobile device of claim 37, wherein the mobile device processor is configured with software instructions to perform operations further comprising:
extracting contact information from the transcribed text data.

42. A mobile device, comprising:
a mobile device processor;
a network interface coupled to the mobile device processor; and
a memory coupled to the mobile device processor,
wherein the mobile device processor is configured with software instructions to perform operations comprising:
receiving a transcription activation indication;
receiving audio data from a telephone conversation;
comparing audio data to a user voice profile store;
identifying audio data matching the user voice profile; and
decrypting at least a portion of the audio data, wherein the portion of the audio data decrypted is limited to audio data not matching the user voice profile; and
transcribing the decrypted audio data into text data.

43. The mobile device of claim 42, wherein the mobile device processor is configured with software instructions to perform operations further comprising:
buffering a portion of the audio data; and
transcribing the buffered audio data into text data.

44. The mobile device of claim 42, wherein the mobile device processor is configured with software instructions to perform operations further comprising:
storing the transcribed text data in a memory of the mobile device.

45. The mobile device of claim 44, wherein the text data is stored in an address book in the mobile device.

46. The mobile device of claim 42, wherein the mobile device processor is configured with software instructions to perform operations further comprising:
extracting contact information from the transcribed text data.

47. A mobile device, comprising:
means for receiving a transcription activation indication;
means for receiving audio data from a telephone conversation;
means for monitoring packets of audio data to determine their origin;
means for identifying an origin of the audio data;
means for decrypting at least a portion of the audio data, wherein the portion of the audio data decrypted is limited to audio data originating from a party other than the mobile device; and
means for transcribing the decrypted audio data into text data.

48. The mobile device of claim 47, further comprising:
means for buffering a portion of the audio data; and
means for transcribing the buffered audio data into text data.

49. The mobile device of claim 47, further comprising:
means for storing the transcribed text data in a memory of the mobile device.

50. The mobile device of claim 49, wherein the text data is stored in an address book in the mobile device.

51. The mobile device of claim 47, further comprising means for extracting contact information from the transcribed text data.

52. A mobile device, comprising:
means for receiving a transcription activation indication at the mobile device;
means for receiving audio data from a telephone conversation;
means for comparing audio data to a user voice profile store;
means for identifying audio data matching the user voice profile;
means for decrypting at least a portion of the audio data, wherein the portion of the audio data decrypted is limited to audio data not matching the user voice profile; and
means for transcribing the decrypted audio data into text data at the mobile device.

53. The mobile device of claim 52, further comprising means for buffering a portion of the audio data; and
means for transcribing the buffered audio data into text data at the mobile device.

54. The mobile device of claim 52, further comprising:
means for storing the transcribed text data at the mobile device.

55. The mobile device of claim 54, wherein the text data is stored in an address book in the mobile device.

56. The mobile device of claim 52, further comprising means for extracting contact information from the transcribed text data at the mobile device.

57. A non-transitory processor-readable storage medium having stored therein processor-executable software instructions configured to cause a mobile device processor to perform operations comprising:
receiving a transcription activation indication;
receiving audio data from a telephone conversation;
monitoring packets of audio data to determine their origin;
identifying an origin of the audio data;
decrypting at least a portion of the audio data, wherein the portion of the audio data decrypted is limited to audio data originating from a party other than the mobile device; and
transcribing the decrypted audio data into text data.

58. The non-transitory processor-readable storage medium of claim 57, wherein the stored processor-executable software instructions are configured to cause the mobile device processor to perform operations further comprising:
buffering a portion of the audio data; and
transcribing the buffered audio data into text data.

59. The non-transitory processor-readable storage medium of claim 57, wherein the stored processor-executable software instructions are configured to cause the mobile device processor to perform operations further comprising:
  storing the transcribed text data in a memory of the mobile device.

60. The non-transitory processor-readable storage medium of claim 59, wherein the text data is stored in an address book in the mobile device.

61. The non-transitory processor-readable storage medium of claim 57, wherein the stored processor-executable software instructions are configured to cause the mobile device processor to perform operations further comprising:
  extracting contact information from the transcribed text data.

62. A non-transitory processor-readable storage medium having stored therein processor-executable software instructions configured to cause a mobile device processor to perform operations comprising:
  receiving a transcription activation indication;
  receiving audio data from the telephone conversation;
  comparing audio data to a user voice profile store;
  identifying audio data matching the user voice profile,
  decrypting at least a portion of the audio data, wherein the portion of the audio data decrypted is limited to audio data not matching the user voice profile; and
  transcribing the decrypted audio data into text data.

63. The non-transitory processor-readable storage medium of claim 62, wherein the stored processor-executable software instructions are configured to cause the mobile device processor to perform operations further comprising:
  buffering a portion of the audio data; and
  transcribing the buffered audio data into text data.

64. The non-transitory processor-readable storage medium of claim 62, wherein the stored processor-executable software instructions are configured to cause the mobile device processor to perform operations further comprising:
  storing the transcribed text data in a memory of the mobile device.

65. The non-transitory processor-readable storage medium of claim 64, wherein the text data is stored in an address book in the mobile device.

66. The non-transitory processor-readable storage medium of claim 62, wherein the stored processor-executable software instructions are configured to cause the mobile device processor to perform operations further comprising:
  extracting contact information from the transcribed text data.

* * * * *